United States Patent
Cavaliere et al.

(10) Patent No.: US 8,554,078 B2
(45) Date of Patent: Oct. 8, 2013

(54) PASSIVE OPTICAL NETWORK WITH PLURAL OPTICAL LINE TERMINALS

(75) Inventors: Fabio Cavaliere, Vecchiano (IT); Stefan Dahlfort, Stockholm (SE); Pierpaolo Ghiggino, Leamington Spa (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 12/993,945

(22) PCT Filed: Aug. 12, 2008

(86) PCT No.: PCT/EP2008/060567
§ 371 (c)(1),
(2), (4) Date: Mar. 7, 2011

(87) PCT Pub. No.: WO2009/141015
PCT Pub. Date: Nov. 26, 2009

(65) Prior Publication Data
US 2011/0158650 A1 Jun. 30, 2011

(30) Foreign Application Priority Data
May 21, 2008 (EP) .................................. 08156687

(51) Int. Cl.
*H04J 14/00* (2006.01)

(52) U.S. Cl.
USPC ............................................. 398/68; 398/72

(58) Field of Classification Search
USPC ...................................... 398/68, 72
See application file for complete search history.

(56) References Cited

U.S. PATENT DOCUMENTS

| 7,773,838 | B2 | 8/2010 | Lee et al. | |
|---|---|---|---|---|
| 2007/0092255 | A1* | 4/2007 | Bouda | 398/72 |
| 2007/0212072 | A1 | 9/2007 | Iannone et al. | |
| 2008/0089684 | A1 | 4/2008 | Smith et al. | |
| 2008/0267630 | A1* | 10/2008 | Qian et al. | 398/89 |
| 2010/0054740 | A1* | 3/2010 | Lee et al. | 398/68 |
| 2010/0290782 | A1* | 11/2010 | Lee et al. | 398/58 |

FOREIGN PATENT DOCUMENTS

| WO | WO 2007/092361 | 8/2007 |
|---|---|---|
| WO | WO 2008/056843 | 5/2008 |

OTHER PUBLICATIONS

International Search Report for PCT/EP2008/060567, mailed Feb. 4, 2009.
Hajduczenia, Marek et al., "10G EPON Stardardization in IEEE 802.3av Project", Optical Fiber Communications/National Fiber Optic Engineers Conference, (Feb. 24, 2008), pp. 1-9.
Rujian, Lin E. et al., "Next Generation PON in Emerging Networks", Optical Fiber Communication/National Fiber Optic Engineers Conference, (Feb. 24, 2008), pp. 1-3.
Swook, Hann et al., "Versatile-PON Service for Next Generation Optical Access Networks", Optical Fiber Communications/National Fiber Optic Engineers Conference, (Feb. 24, 2008), pp. 1-3.

* cited by examiner

*Primary Examiner* — Nathan Curs
(74) *Attorney, Agent, or Firm* — Nixon & Vanderhye, P.C.

(57) ABSTRACT

An optical network includes a first passive optical network optical line terminal, coupled to a first port of a first optical filter arrangement, and a second passive optical network optical line terminal, coupled to a second port of the first optical filter arrangement. An optical coupler is connected between the second passive optical network line terminal and the second port of the first optical filter arrangement. A passive optical distribution node is coupled to a third port of the first optical filter arrangement.

18 Claims, 7 Drawing Sheets

PASSIVE OPTICAL NETWORK WITH PLURAL OPTICAL LINE TERMINALS

This application is the U.S. national phase of International Application No. PCT/EP2008/060567, filed 12 Aug. 2008, which designated the U.S. and claims priority to EP Application No. 08156687.9, filed 21 May 2008, the entire contents of each of which are hereby incorporated by reference.

FIELD OF THE INVENTION

The present invention relates to passive optical networks such as fibre access networks, and to associated methods of provisioning such networks.

BACKGROUND OF THE INVENTION

Optical fibre access networks provide communication facilities to subscribers utilizing an optical network of fibres extending from the subscribers premises to a central office of a network provider or operator. Typically a passive optical network (PON) having a point-to-multi-point architecture is used as this is considered the most cost effective solution.

The passive optical network comprises an optical line terminal (OLT) at the central office which is coupled to the point-to-multi-point optical network of fibres. This fibre network uses a number of power splitters to distribute signals via optical fibre to each subscriber, such that an optical signal from the OLT will propagate to optical network terminations (ONT) for each subscriber. Different wavelengths are used for the uplink and downlink optical signals between the passive optical networking OLT and ONT's. Such wavelengths are selected to be outside of the wavelength ranges used in other optical transmission techniques.

For example, typically 1310 nm is used for upstream transmission (from the OLT's to the ONT) and 1490 nm for downstream transmission (from the ONT to the OLT's). To allow compatibility between equipment from different vendors/between different networks, it is important that optical networks conform to standards. Various standards have been agreed for different protocols for operating these PON, including GPON (Gigabit passive optical network—ITU-T G.984) and EPON (Ethernet passive optical network—IEEE 802.3ah). Within GPON, optical signals can be transmitted from the OLT to ONT's at up to 2.5 Gb/s, without requiring optical amplification.

It is widely expected that the next generation of fibre access networks will rely on wavelength divisional multiplexing (WDM) techniques. Various standards have been agreed for WDM systems, including ITU-T G.694.1 & G.694.2 which specify the grids of wavelengths allowed for use in two different WDM systems.

However, it may be some time before WDM optical components become cost competitive. As such, conventional PONs are likely to continue to be installed in the near future. Various arrangements have been proposed for integrating WDM based fibre access networks into existing conventional PON in order to allow for upgrading the capacity of such PON, when cost-effective WDM optical components become available.

SUMMARY OF THE INVENTION

In a first aspect, the present invention provides an optical network comprising: a first passive optical network optical line terminal arranged to transmit a first optical signal at a first wavelength, coupled to a first port of a first optical filter arrangement; a second passive optical network optical line terminal arranged to transmit a second optical signal at a second, different wavelength, coupled to a second port of the first optical filter arrangement; an optical coupler connected between the second passive optical network line terminal and the second port of the first optical filter arrangement, for coupling a plurality of optical signals at a predetermined set of wavelengths from a third optical line terminal into said second port; and a passive optical distribution node for connection to a plurality of optical network terminations, coupled to a third port of the first optical filter arrangement for distribution of optical signals between the optical line terminals and said plurality of optical network terminations, wherein the first optical filter arrangement is arranged to pass optical signals at said first wavelength between the first port and the third port and to block optical signals at said second wavelength and said predetermined set of wavelengths between the first port and the third port, and the first optical filter arrangement is further arranged to pass optical signals at said second wavelength and said predetermined set of wavelengths between the second port and the third port and to block optical signals at said first wavelength between the second port and the third port; and the second optical signal is at a faster rate than the first optical signal, and the second wavelength and the predetermined set of wavelengths are within an amplification band of a doped fibre amplifier.

Such a network configuration goes against established principles, as the second PON OLT uses a wavelength within an amplification band of a doped fibre amplifier. Such wavelengths are normally restricted for use in WDM systems, and it is known that it is not desirable to use such wavelengths in none-WDM systems. However, the present inventors have realised that this counter-intuitive selection of wavelengths, in combination with the particular configuration described, allows a PON network such as a GPON to be upgraded in two steps, first to include the second PON OLT transmitting at a faster bit rate (e.g. at 10 Gb/s), and then subsequently upgraded to include a third PON OLT (which could use WDM). Thus the original network infrastructure of transmission fibre can be maintained, and efficiently used.

The optical network may comprise said third optical line terminal connected to the optical coupler and arranged to transmit said plurality of optical signals at the predetermined set of wavelengths into said second port, and wherein the second wavelength is not one of said predetermined set of wavelengths.

The second wavelength may be a wavelength on an ITU-T grid specified for wavelength division multiplexed transmission.

The predetermined set of wavelengths may be wavelengths on an ITU-T grid specified for wavelength division multiplexed transmission.

The second passive optical network line terminal may be arranged to receive a further optical signal at a further wavelength. The first optical filter arrangement may be arranged to block optical signals at said further wavelength between the first port and the third port, and may be further arranged to pass optical signals at said further wavelength between the second port and the third port for transmission of optical signals at said further wavelength from at least one of the plurality of optical network terminations. The further wavelength may be outside of the amplification band of the doped fibre amplifier.

The passive optical distribution node may comprise a first splitter coupled to the third port of the first filter arrangement, and arranged to split optical signals from the first optical filter arrangement into two portions, a first portion for distribution to a first plurality of optical network terminations and a second portion for transmission to an optical demultiplexer for demultiplexing the predetermined set of wavelengths from the third optical line terminal for transmission to a second plurality of optical network terminations.

The first splitter may be coupled to a second splitter arranged to split said first portion of the optical signals into a plurality of optical signals for transmission to respective optical network terminations of said first plurality of optical network terminations.

The passive optical distribution node may comprise said optical demultiplexer arranged to demultiplex the predetermined set of wavelengths from the third optical line terminal to individual wavelengths for transmission of the individual wavelengths to the second plurality of optical network terminations.

The optical network may comprise at least one optical network termination coupled to the passive optical distribution node and arranged to receive the second optical signal from the second passive optical network optical line terminal, said at least one optical network termination comprising an optical filter arrange to pass optical signals at the second wavelength and to block optical signals at the first wavelength and the predetermined set of wavelengths.

The second passive optical network optical line terminal may comprise a doped fibre amplifier arranged to amplify the second optical signal for transmission.

The second passive optical network optical line terminal may comprise a second optical filter arrangement arranged to pass signals at the second wavelength for transmission and block incoming signals at the predetermined set of wavelengths.

The second optical filter arrangement may comprise at least one of an optical isolator and a bandpass filter.

The fibre amplifier may be an erbium doped fibre amplifier.

The amplification band may be the C-band of the erbium doped fibre amplifier.

The first passive optical network optical line terminal may be arranged to transmit only the first optical signal at the first wavelength, and the second passive optical network optical line terminal is arranged to transmit only the second optical signal at the second, different wavelength In a second aspect, the present invention provides a method of provisioning an optical network comprising: coupling a first passive optical network optical line terminal arranged to transmit a first optical signal at a first wavelength, to a first port of a first optical filter arrangement; coupling a second passive optical network optical line terminal arranged to transmit a second optical signal at a second, different wavelength, to a second port of the first optical filter arrangement; connecting an optical coupler between the second passive optical network line terminal and the second port of the first optical filter arrangement, for coupling a plurality of optical signals at a predetermined set of wavelengths from a third optical line terminal into said second port; and coupling a passive optical distribution node for connection to a plurality of optical network terminations, to a third port of the first optical filter arrangement for distribution of optical signals between the optical line terminals and said plurality of optical network terminations, wherein the first optical filter arrangement is arranged to pass optical signals at said first wavelength between the first port and the third port and to block optical signals at said second wavelength and said predetermined set of wavelengths between the first port and the third port, and the first optical filter arrangement is further arranged to pass optical signals at said second wavelength and said predetermined set of wavelengths between the second port and the third port and to block optical signals at said first wavelength between the second port and the third port; and the second optical signal is at a faster rate than the first optical signal, and the second wavelength and the predetermined set of wavelengths are within an amplification band of a doped fibre amplifier.

The method of provisioning may comprise: connecting said third optical line terminal to the optical coupler, the third optical line terminal being arranged to transmit said plurality of optical signals at the predetermined set of wavelengths into said second port, and wherein the second wavelength is not one of said predetermined set of wavelengths.

The method of provisioning may comprise: coupling at least one optical network termination to the passive optical distribution node, to receive the second optical signal from the second passive optical network optical line terminal, said at least one optical network termination comprising an optical filter arrange to pass optical signals at the second wavelength and to block optical signals at the first wavelength and the predetermined set of wavelengths.

BRIEF DESCRIPTION OF THE DRAWINGS

An embodiment of the present invention will now be described, by way of example only, with reference to the accompanying figures, in which.

DETAILED DESCRIPTION OF THE EMBODIMENT

The present inventors has realised that whilst the next generation of fibre access networks may rely on WDM techniques, it can be desirable to upgrade existing fibre access networks such as PON with faster bit-rate systems. For example, an existing GPON could be upgraded by incorporating 10G PON (i.e. passive optical network technology configured to transmit at 10 Gb/s, four times the bit-rate of GPON systems).

The present inventors have therefore proposed a suitable system architecture which would allow telecom operators to re-use the same fibre of a GPON system to upgrade to utilising 10G PON (e.g. in a first upgrade or provisioning step), and then to upgrade the same fibre network to WDM PON (e.g. in a second upgrade or provisioning step) whilst minimising the impact on existing equipment, minimising the disruption of the network required for each upgrade, and allowing continued use of the previous equipment after each upgrade.

Figure 1:
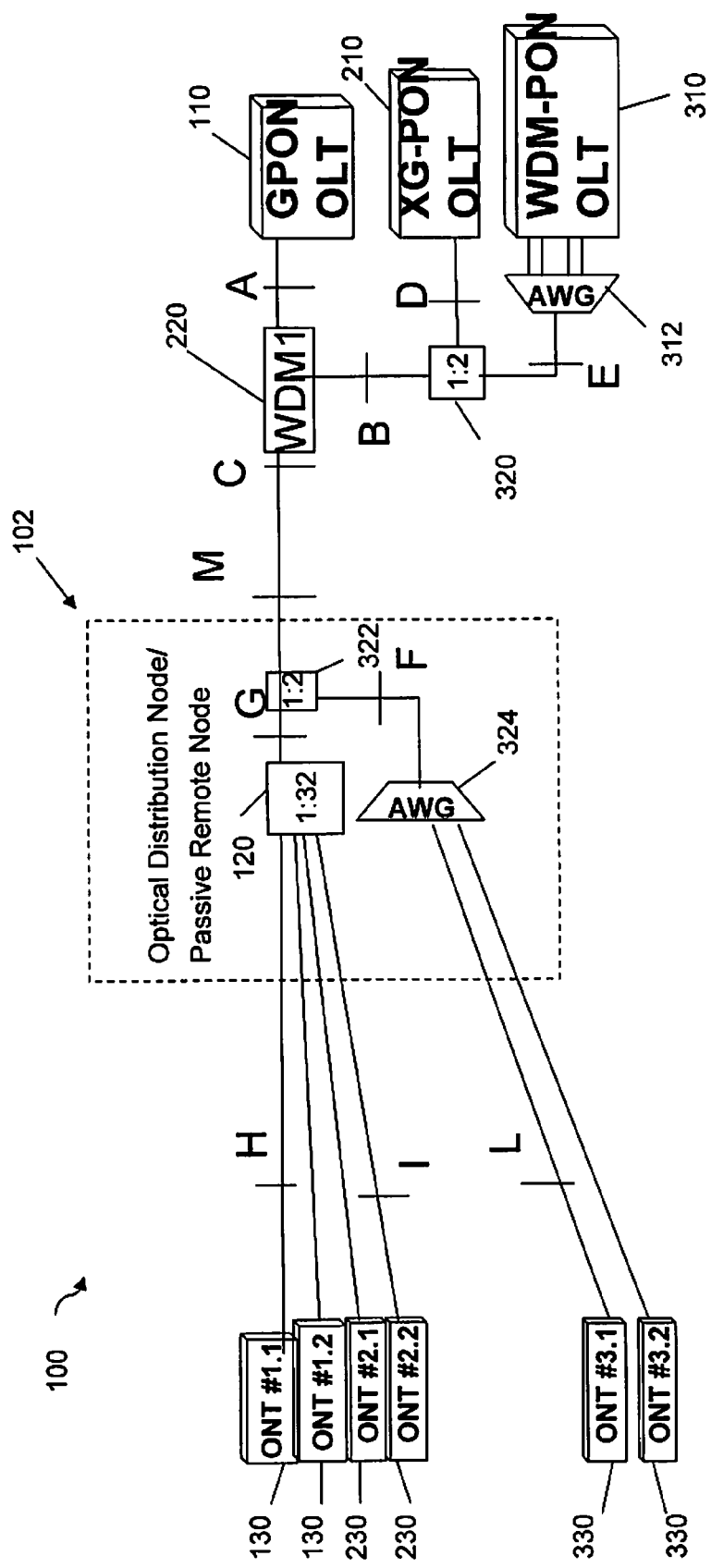
FIG. 1 is a schematic diagram of an optical network in accordance with an embodiment of the present invention.

FIG. 1 is a schematic diagram of an optical network 100, illustrated as having been upgraded from an initial GPON network configuration to include both 10GPON (also referred to as XG-PON) and also WDM-PON. The term WDM used herein includes the options of Course WDM (CWDM) and Dense WDM (DWDM).

The network 100 comprises a first passive optical network line terminal 110, which in this embodiment is a GPON OLT. The network 100 also comprises a second passive optical network optical line terminal 210 (here, a XG-PON OLT) and a third passive optical network optical line terminal 310 (here, a PON OLT utilising DWDM transmission wavelengths).

A first optical filter arrangement 220 is provided to aggregate the signals from the respective optical line terminals, for transmission along a single optical transmission medium (e.g. an optical fibre) to a passive optical distribution node 102 (also referred to as a passive remote node). The optical distribution node 102 is arranged to distribute the optical signals from the optical line terminals 110, 210, 310 to respective optical network terminations 130, 230, 330. Typically, each OLT 110, 210, 310 will communication with a plurality of respective ONTs 130, 230, 330.

The first optical filter arrangement 220 comprises three ports A, B, C. The first OLT 110 is coupled to the first port A. The second and third OLTs 210, 310 are coupled to the second port B. The third port C of the first optical filter arrangement 220 is coupled to the passive optical distribution node 102. The terms "coupled" and "connected" used herein are used to indicate that the items are optically connected e.g. connected by an optical transmission medium such as fibre, and in some cases optical components, each of which allows the transmission of optical signals.

The wavelength plan for the optical network 100 in the particular embodiment has been carefully selected so as to allow a 10G PON system to co-exist with G-PON and WDM-PON systems. The first OLT 110 is arranged to transmit optical signals at a first wavelength (1490 nm), in a downstream direction to respective ONTs 130, and to receive information from the ONTs 130 on a different, respective receive (upstream) wavelength (1310 nm).

The higher bit-rate downstream transmission optical signal from the second OLT 210 to the respective ONTs 230 is at a second wavelength, within an amplification band of a doped fibre amplifier. Preferably, this second wavelength used for downstream transmission from the second OLT 210 is within the amplification band of an erbium doped fibre amplifier, and most preferably within the C band (from 1530 nm to 1565 nm), rather than the L-band (from 1565 nm to 1625 nm). For example, the second OLT 210 can be used to transmit information downstream on a stable wavelength on the 100 GHz ITU-T WDM grid e.g. at 1560 nm. Providing such a stable wavelength allows the downstream transmission of the 10G-PON transmission to co-exist with other WDM wavelengths or channels e.g. with DWDM channels from the third OLT 310. Further, utilising such a wavelength for the downstream transmission allows optical amplification of the downstream signal at the second OLT 210, thus allowing amplification costs to be divided among the different users. Optical amplification is typically required due to the high bit-rate of the 10G-PON compared with GPON.

The optical signals transmitted upstream from the ONTs 230 to the OLT 210 will typically be on a further wavelength that is outside of the ITU-T grid for WDM transmission, and outside of the amplification band of the relevant doped fibre amplifier. Such upstream transmissions are typically at a lower bit-rate (e.g. 2.5 Gb/s). The upstream optical signals do not require optical amplification, and so can be transmitted on a wavelength within a different band e.g. the O-band (from 1260 nm to 1360 nm) and can be less stable than the stability required for the ITU-T grid. For example, in this embodiment the upstream transmission from each ONT 230 to the second OLT 210 is an optical signal of wavelength 1270 nm (e.g. with a poorer stability than the 100 GHz stability of the downstream signal e.g. a bandwidth/stability of +/−10 nm).

The third OLT 310 (WDM-PON OLT) is arranged to transmit a plurality of optical signals at a predetermined set of wavelengths to the ONTs 330, with the set of wavelengths being demultiplexed (by the optical distribution node 102) such that each wavelength is sent to a respective ONT 330. Each ONT 330 is arranged to transmit upstream signals on a respective wavelength, the wavelengths forming a plurality of optical signals on a predetermined set of wavelengths. Typically, each set of wavelengths will be specified by an ITU-T standard wavelength grid as being suitable for WDM transmission. Each set of wavelengths will not include the wavelength of the second optical signal used for downstream transmission by the second OLT 210. However, as with the second OLT 210, preferably each set of wavelengths will lie within an amplification band of a doped fibre amplifier, and most preferably within the C-band of an erbium doped fibre amplifier. Typically, the upstream and downstream channels of the third OLT 310 will be based on one of the 100 GHz, 50 GHz or 25 GHz ITU-T grids specified for WDM transmission.

Figure 2:
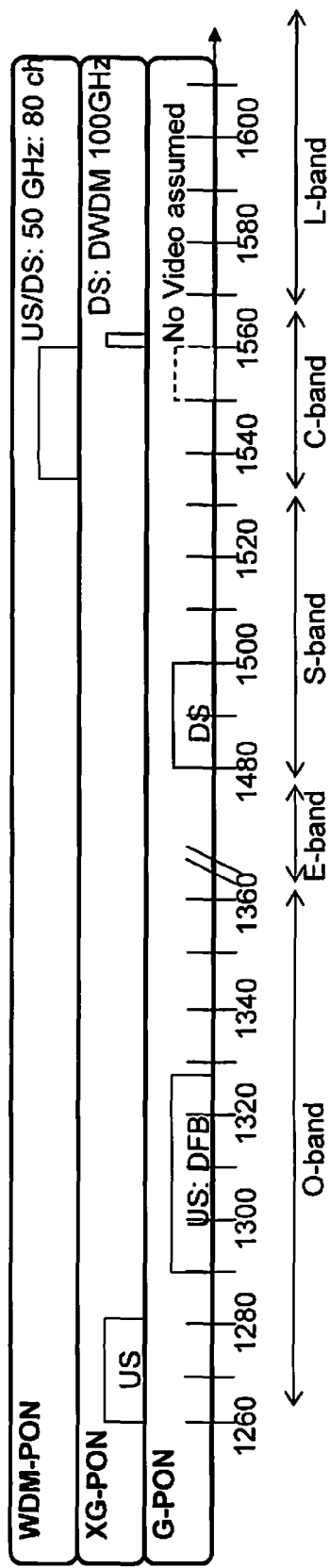
FIG. 2 illustrates the wavelengths of the upstream and downstream optical signals of the optical line terminals shown in the embodiment of FIG. 1.

FIG. 2 illustrates suitable wavelength allocation bands for use in the embodiment of FIG. 1. The term "US" indicates the wavelengths suitable for upstream transmission, and "DS" the wavelengths for downstream transmission; the numerical scale is the wavelength in nanometers.

Figure 3:
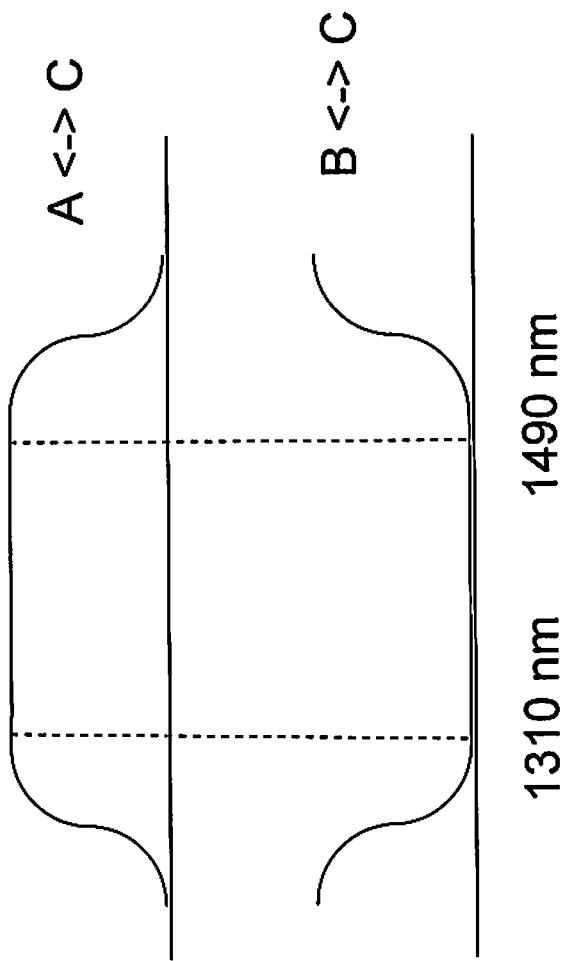
FIGS. 3A & 3B illustrate the frequency response of the first filter arrangement shown in the embodiment of FIG. 1.

The first optical filter arrangement 220 is configured such that no signal passes between the first port A and the second port B. FIGS. 3A & 3B illustrate the different transmission characteristics between the different ports. FIG. 3A shows that the transmission characteristic from the first port (coupled to the first OLT 110) to the third port (coupled to the optical distribution node 102) allows the transmission of the upstream and the downstream wavelengths (1490 nm & 1310 nm) of the first GPON OLT 110, and blocks wavelengths for the other OLTs 210, 310. FIG. 3B shows that such 1490 & 1310 nm upstream and downstream wavelengths are blocked from transmission between the third port C and the second port B (to which are coupled the second and third OLTs), but the wavelengths for the OLTs 210 and 310 upstream and downstream transmissions are passed.

A 1:2 optical coupler 320 is coupled to the second port of the optical filter arrangement 220, for aggregating signals for downstream transmission from the OLTs 210, 310 (and also, for splitting upstream signal transmissions to each OLT 210, 310). The OLT 210 includes a port D for input & output of the upstream and downstream signals, whilst the third OLT 310 includes a corresponding port E for input and output of corresponding upstream and downstream signals. The coupler 320 may be wavelength independent. The third OLT 310 includes a multiplexer/demultiplexer 312 (here, an arrayed wave guide, AWG) for multiplexing downstream signals of different wavelengths from different sources with the OLT 310 onto a single optical transmission medium, and for demultiplexing upstream signals from the ONTs 330 for the different wavelength destinations (e.g. receivers within the OLT).

The configuration of the optical distribution node 102 will now be described in more detail. The optical distribution node 102 is coupled, at input port M to the third port C of the first optical filter arrangement 220. The optical distribution node 102 includes a first splitter 322 (typically, a 1:2 splitter that is wavelength independent) for power splitting the aggregated downstream signals from the OLTs 110, 210, 310 (and conversely, for combining the upstream signals from the ONTs 130, 230, 330). The splitter 322 splits downstream signals into a first portion for distribution to a first group of optical network terminals (130, 230), and a second portion for transmission to a second group of ONTs 330 via an optical demultiplexer 324 within the optical distribution node 102.

The demultiplexer 324, demultiplexes the second portion into signals at different wavelengths within the predetermined set of downstream wavelengths, for transmission of the different wavelengths to respective ONTs 330. The optical demultiplexer 324 also acts as a multiplexer for upstream signals from the ONTs 330 to which the demultiplexer output is connected. Typically the demultiplexer will be implemented as an AWG. The demultiplexer is arranged to only demultiplex (and multiplex) the relevant sets of wavelengths for upstream and downstream signals for transmission between the third OLT 310 and the respective ONTs 330. Thus, signals on other wavelengths (e.g. upstream and downstream transmissions between first and second OLTs 110, 210 and their respective ONTs) are blocked by the demultiplexer 324.

Coupled to the other output of the splitter 322, and arranged to receive the first portion of optical signals from splitter 322, is a second splitter 120 for splitting the first portion of the optical signals into a plurality of optical signals for transmission to respective ONTs 130, 230 i.e. the ONTs corresponding to the first and second OLTs 110, 210. Typically, the splitter 120 will be a wavelength-independent power splitter.

The ONTs 110 for communication with the first OLT 110 (e.g. using conventional GPON) each comprise a blocking filter for rejecting any radio frequency overlay video channel; such blocking filters will also act to block the 10G-PON downstream channel signal from the second OLT 210, and the WDM signals from the third OLT 310. Point H represents a nominal input port to an ONT 130, with the relevant blocking filter being connected to that port.

Figure 4:
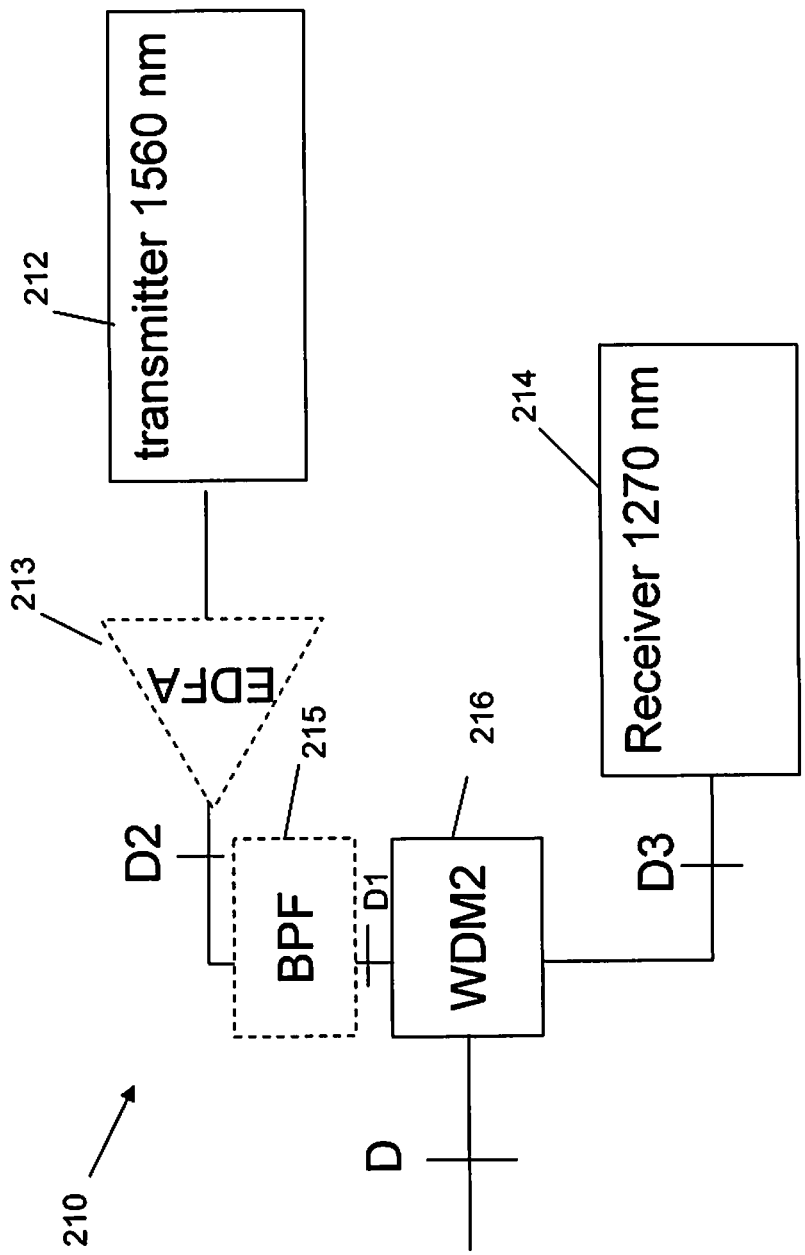
FIG. 4 is a schematic diagram of the second passive optical network optical line terminal shown in the embodiment of FIG. 1.
Figure 5:
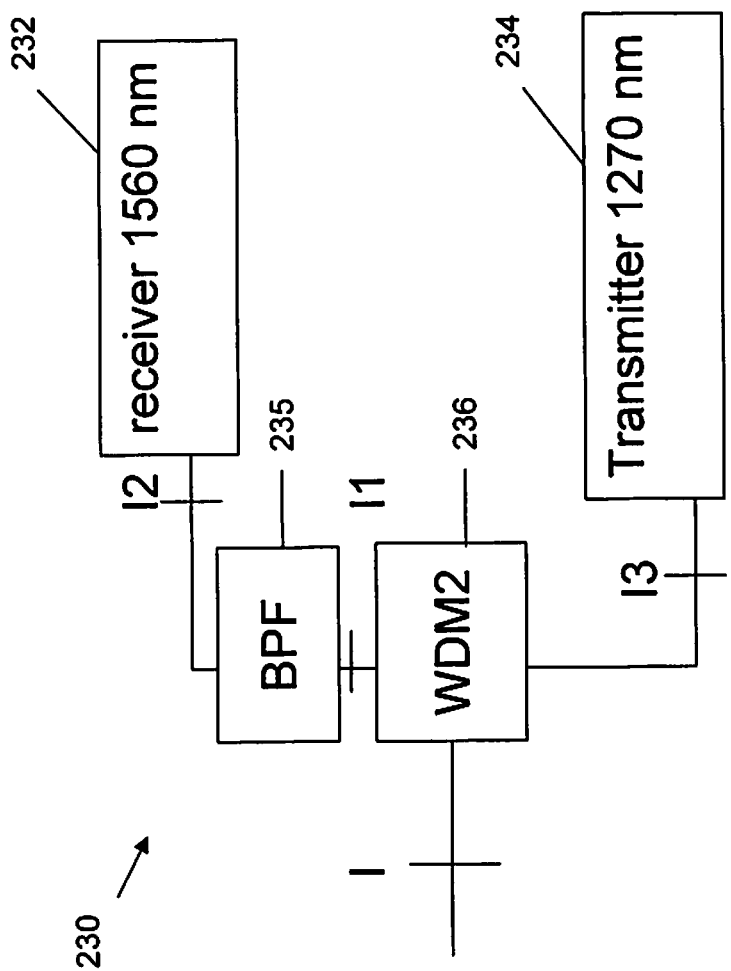
FIG. 5 is a schematic diagram of an embodiment of an optical network termination for receiving an optical signal from the second passive optical network optical line terminal shown in the embodiment of FIG. 1.

FIG. 4 shows a typically architecture of the second OLT 210, with FIG. 5 showing the corresponding architecture of the corresponding ONT 230 for communication with such an OLT 210.

As shown in FIG. 4, the OLT 210 includes a transmitter 212 with output D2, arranged to transmit downstream signals at the second wavelength 1560 nm, and a receiver 214 (input D3) for receiving upstream signals (e.g. at the further wavelength of 1270 nm). A filter 216 coupled to the input port D of the OLT 210, and to the output D2 of the transmitter arrangement 212 and to the input port D3 of the receiver 214, is arranged to separate the relevant downstream (e.g. 1560 nm) and upstream (e.g. 1270 nm) signals.

Optionally, the OLT 210 can include a band pass filter 215, arranged to reject the signals at the predetermined set of wavelengths used for downstream transmission by the third optical line terminal 310 e.g. to reject other WDM channels different from the 1560 nm signal. Instead of using such a band pass filter 215, an optical isolator could be inserted, between the transmitter 212 and the filter 216, and arranged to only transmit signals downstream from the transmitter 212, and to reject upstream signals. Also optionally, an optical amplifier 213 (e.g. a doped fibre amplifier, such as an erbium doped fibre amplifier) can be included within the transmitter 212 to amplify the downstream signals. Providing such an amplifier within the OLT 210 allows the cost of such an amplifier to be shared across a number of users, as it can amplify the signals received by several ONTs 230.

FIG. 5 shows the corresponding structure of an ONT 230 arranged to receive the relatively high bit-rate signals (e.g. at 10G) from the second OLT 210. The ONT 230 comprises a receiver 232 with input I2 for receiving the downstream signals, and a transmitter 234 with output I3 for transmitting the upstream signals. The input port I of the ONT 230 is coupled to a filter 236. The filter 236 is arranged to pass optical signals at the downstream wavelength (i.e. the second wavelength 1560 nm), via output I1 to the receiver 232 and to pass optical signals from the transmitter 234 to the port I. The ONT 230 comprises a bandpass filter 235, coupled between the port I and the input 12 of the receiver 232. The bandpass filter is arranged to only pass signals at the second wavelength (e.g. 1560 nm), thus filtering out other signals e.g. blocking the downstream wavelengths transmitted from OLTs 110 & 310.

Figures 6A, 6B, 6C:
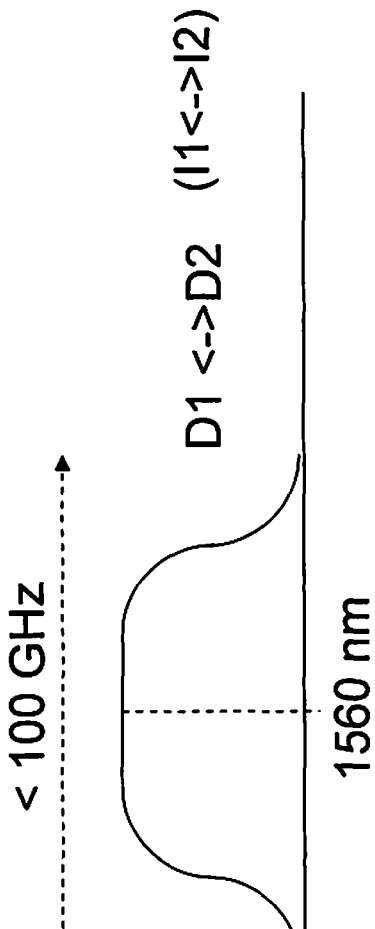
FIGS. 6A, 6B & 6C illustrate an example frequency response suitable for both the optional second filter arrangement of the second passive optical network optical line terminal shown in FIG. 5 and the bandpass filter of the optical network termination shown in FIG. 5.

FIGS. 6A-6C show the transmission characteristics of the relevant filters 216, 236 and band pass filters 215, 235 illustrated in FIGS. 4 & 5. FIG. 6A shows that the band pass filters 215, 235 are arranged to pass signals at the second wavelength (e.g. 1560 nm), and block signals at other wavelengths. In this embodiment, as the downstream signal is transmitted with stability within 100 GHz, the band pass filter is arranged to only substantially have a 100 GHz pass band.

FIGS. 6B & 6C show the corresponding performances between the different input and output ports of filters 216, 236.

FIG. 1 illustrates a version of the optical network 100 including all three different types of OLT 110, 210, 310, with each OLT type using a different transmission type (e.g. single or set of wavelengths, and/or different bit-rates). Such an optical network could be configured by installing simultaneously all of the elements shown in the optical network 100. However, one significant advantage of the configuration shown in FIG. 1 is that the optical network 100 can be achieved by incremental upgrading of an existing optical network.

Figure 7:
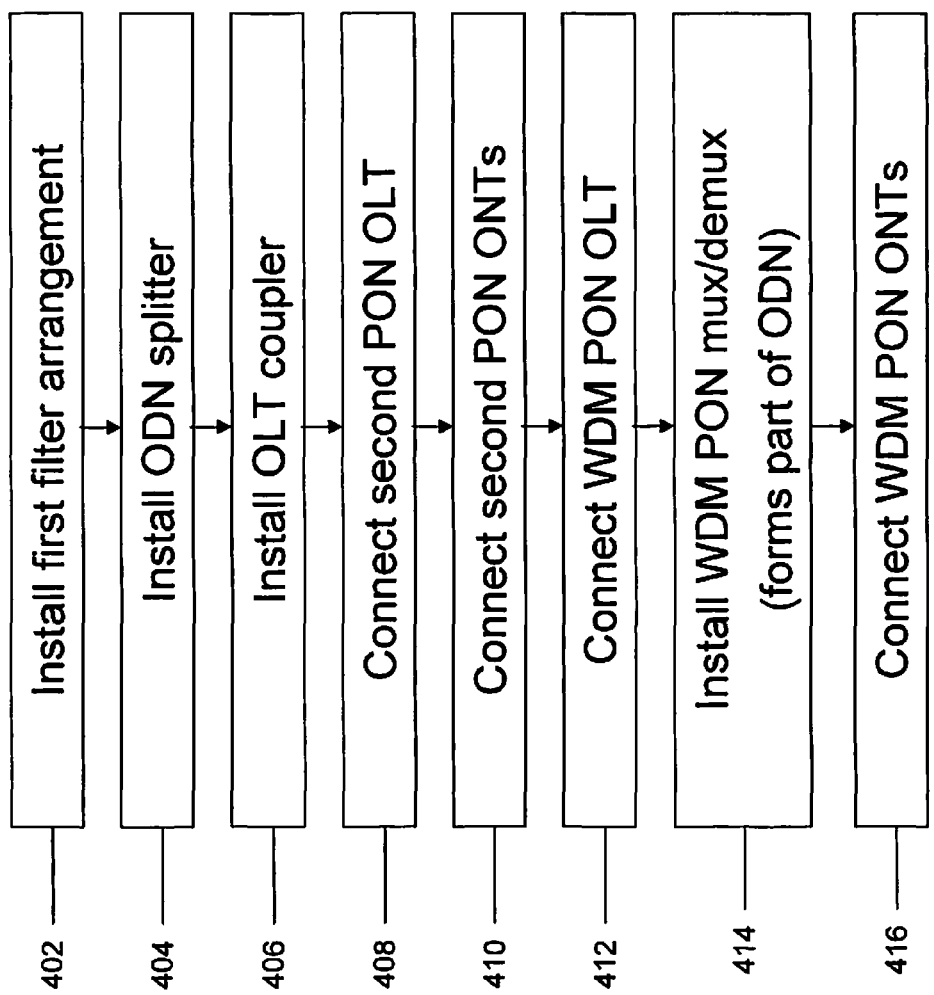
FIG. 7 is a flowchart of a method of provisioning an optical network in accordance with an embodiment of the present invention.

For example, a G-PON optical network could be provided, in which a GPON OLT 110 is coupled via a splitter 120 directly to corresponding ONTs 130. This could be incrementally upgraded (i.e. modified or provisioned) using the method steps illustrated in the flow chart of FIG. 7. For convenience, description of the apparatus used in the upgrade will be given with reference to the same reference numerals used in the completed optical network 100 shown in FIG. 1.

Firstly, to allow subsequent installation of the second & third OLTs 210, 310, the first filter arrangement 220 can be installed, with the third port A connected to the first OLT 110, and the third port C connected to the optical distribution node 102 (step 402). In the initial optical distribution node of the GPON optical network, it is assumed that the optical distribution node simply comprises the splitter 120. To allow subsequent WDM upgrade, the optical distribution node 102 is modified by installing the splitter 322 coupled between the splitter 120 and the third port C of the first filter arrangement 220 (step 404).

The above steps 402 & 404 require the network traffic to be interrupted whilst the installation is taking place. In a preferred embodiment to the present invention, the initial network (e.g. the GPON network) is installed with the splitter 322 and the first filter arrangement 220 already in place.

Subsequently, for installation of the higher bit-rate PON (e.g. the 10G-PON) the OLT 210 may be added to the network 100 by coupling the second OLT 210 to the second port B of the filtering arrangement 220 (step 408). Most preferably, to allow subsequent ease of later provisioning of a third OLT 310, the coupler 320 is first installed (step 406), with the OLT 210 being coupled to the filtering arrangement 220 via the OLT coupler 320.

The corresponding ONTs 230 can then be connected as desired to the second splitter 120 (step 410).

When it is desired to further upgrade the optical network 100 to include WDM-PON technology, this can be done relatively easily by:
(1) installing the third OLT 310, including coupling the third OLT 310 to the first optical filtering arrangement 220 via the coupler 320 (step 412),
(2) upgrading the optical distribution node 102 to include the multiplexer/demultiplexer 324 (i.e. coupling the multiplexer/demultiplexer 324 to the first splitter 322, for demultiplexing downstream optical signals from the OLT 310, and for multiplexing upstream signals from any ONT 330 to the OLT 310 (step 414)), and
(3) connecting the corresponding ONT 330 to the multiplexer/demultiplexer 324 (step 416).

Thus, a telecom operator can reuse the same fibre in an evolutionary scenario, by first installing a first type of PON (e.g. a G-PON), then subsequently adding a faster bit-rate PON (e.g. a 10G-PON) without replacing the original PON equipment. Additionally, a further PON (e.g. a WDM-PON, such as a DWDM PON) can be added in an additional upgrade step, with again no change of the existing equipment.

The invention claimed is:

1. An optical network comprising:
    a first passive optical network optical line terminal arranged to transmit a first optical signal at a first wavelength, coupled to a first port of a first optical filter arrangement;
    a second passive optical network optical line terminal arranged to transmit a second optical signal at a second, different wavelength, coupled to a second port of the first optical filter arrangement;
    an optical coupler connected between the second passive optical network line terminal and the second port of the first optical filter arrangement, for coupling a plurality of optical signals at a predetermined set of wavelengths from a third optical line terminal into said second port; and
    a passive optical distribution node for connection to a plurality of optical network terminations, coupled to a third port of the first optical filter arrangement for distribution of optical signals between the optical line terminals and said plurality of optical network terminations, wherein
    the first optical filter arrangement is arranged to pass optical signals at said first wavelength between the first port and the third port and to block optical signals at said second wavelength and said predetermined set of wavelengths between the first port and the third port, and the first optical filter arrangement is further arranged to pass optical signals at said second wavelength and said predetermined set of wavelengths between the second port and the third port and to block optical signals at said first wavelength between the second port and the third port; and the second optical signal is at a faster rate than the first optical signal, and
    the second wavelength and the predetermined set of wavelengths are within an amplification band of a doped fibre amplifier.

2. An optical network as claimed in claim 1, comprising said third optical line terminal connected to the optical coupler and arranged to transmit said plurality of optical signals at the predetermined set of wavelengths into said second port, and wherein the second wavelength is not one of said predetermined set of wavelengths.

3. An optical network as claimed in claim 1, wherein the second wavelength is a wavelength on an ITU-T grid specified for wavelength division multiplexed transmission.

4. An optical network as claimed in claim 1, wherein the predetermined set of wavelengths are wavelengths on an ITU-T grid specified for wavelength division multiplexed transmission.

5. An optical network as claimed in claim 1, wherein the second passive optical network line terminal is arranged to receive a further optical signal at a further wavelength,
    the first optical filter arrangement is arranged to block optical signals at said further wavelength between the first port and the third port, and is further arranged to pass optical signals at said further wavelength between the second port and the third port for transmission of optical signals at said further wavelength from at least one of the plurality of optical network terminations, and
    the further wavelength is outside of the amplification band of the doped fibre amplifier.

6. An optical network as claimed in claim 1, wherein the passive optical distribution node comprises a first splitter coupled to the third port of the first filter arrangement, and arranged to split optical signals from the first optical filter arrangement into two portions, a first portion for distribution to a first plurality of optical network terminations and a second portion for transmission to an optical demultiplexer for demultiplexing the predetermined set of wavelengths from the third optical line terminal for transmission to a second plurality of optical network terminations.

7. An optical network as claimed in claim 6, wherein the first splitter is coupled to a second splitter arranged to split said first portion of the optical signals into a plurality of optical signals for transmission to respective optical network terminations of said first plurality of optical network terminations.

8. An optical network as claimed in claim 6, wherein the passive optical distribution node comprises said optical demultiplexer arranged to demultiplex the predetermined set of wavelengths from the third optical line terminal to individual wavelengths for transmission of the individual wavelengths to the second plurality of optical network terminations.

9. An optical network as claimed in claim 1, comprising at least one optical network termination coupled to the passive optical distribution node and arranged to receive the second optical signal from the second passive optical network optical line terminal, said at least one optical network termination comprising an optical filter arrange to pass optical signals at the second wavelength and to block optical signals at the first wavelength and the predetermined set of wavelengths.

10. An optical network as claimed in claim 1, wherein the second passive optical network optical line terminal comprises a doped fibre amplifier arranged to amplify the second optical signal for transmission.

11. An optical network as claimed in claim 1, wherein the second passive optical network optical line terminal comprises a second optical filter arrangement arranged to pass signals at the second wavelength for transmission and block incoming signals at the predetermined set of wavelengths.

12. An optical network as claimed in claim 11, wherein the second optical filter arrangement comprises at least one of an optical isolator and a bandpass filter.

13. An optical network as claimed in claim 1, wherein the fibre amplifier is an erbium doped fibre amplifier.

14. An optical network as claimed in claim 13 wherein the amplification band is the C-band of the erbium doped fibre amplifier.

15. An optical network as claimed in claim 1, wherein the first passive optical network optical line terminal is arranged to transmit only the first optical signal at the first wavelength, and the second passive optical network optical line terminal is arranged to transmit only the second optical signal at the second, different wavelength.

16. A method of provisioning an optical network comprising:
 coupling a first passive optical network optical line terminal arranged to transmit a first optical signal at a first wavelength, to a first port of a first optical filter arrangement;
 coupling a second passive optical network optical line terminal arranged to transmit a second optical signal at a second, different wavelength, to a second port of the first optical filter arrangement;
 connecting an optical coupler between the second passive optical network line terminal and the second port of the first optical filter arrangement, for coupling a plurality of optical signals at a predetermined set of wavelengths from a third optical line terminal into said second port; and
 coupling a passive optical distribution node for connection to a plurality of optical network terminations, to a third port of the first optical filter arrangement for distribution of optical signals between the optical line terminals and said plurality of optical network terminations, wherein the first optical filter arrangement is arranged to pass optical signals at said first wavelength between the first port and the third port and to block optical signals at said second wavelength and said predetermined set of wavelengths between the first port and the third port, and the first optical filter arrangement is further arranged to pass optical signals at said second wavelength and said predetermined set of wavelengths between the second port and the third port and to block optical signals at said first wavelength between the second port and the third port; and
 the second optical signal is at a faster rate than the first optical signal, and the second wavelength and the predetermined set of wavelengths are within an amplification band of a doped fibre amplifier.

17. A method of provisioning an optical network as claimed in claim 16, comprising:
 connecting said third optical line terminal to the optical coupler, the third optical line terminal being arranged to transmit said plurality of optical signals at the predetermined set of wavelengths into said second port, and wherein the second wavelength is not one of said predetermined set of wavelengths.

18. A method of provisioning an optical network as claimed in claim 16, comprising:
 coupling at least one optical network termination to the passive optical distribution node, to receive the second optical signal from the second passive optical network optical line terminal, said at least one optical network termination comprising an optical filter arrange to pass optical signals at the second wavelength and to block optical signals at the first wavelength and the predetermined set of wavelengths.

* * * * *